United States Patent
Bass

(10) Patent No.: US 6,405,826 B1
(45) Date of Patent: Jun. 18, 2002

(54) HANGER WITH SWIVEL ARM

(76) Inventor: Trampass N. Bass, 197 Upper Tyty Rd., Tifton, GA (US) 31794

( * ) Notice: Subject to any disclaimer, the term of this patent is extended or adjusted under 35 U.S.C. 154(b) by 0 days.

(21) Appl. No.: 09/714,307

(22) Filed: Nov. 16, 2000

Related U.S. Application Data

(60) Provisional application No. 60/244,860, filed on Nov. 1, 2000.

(51) Int. Cl.$^7$ ............................. F01N 1/08; F16L 3/02
(52) U.S. Cl. ............................. 181/228; 248/60; 248/62
(58) Field of Search ................................. 181/227, 228, 181/282; 248/58, 60, 62, 74.1, 74.2, 610; 180/309, 311, 89.2; 285/199

(56) References Cited

U.S. PATENT DOCUMENTS

| | | | | |
|---|---|---|---|---|
| 3,292,887 A | * | 12/1966 | Cassel et al. ................. | 248/60 |
| 3,888,439 A | * | 6/1975 | Tuttle ........................... | 248/62 |
| 3,960,232 A | * | 6/1976 | Hubbell, III ................. | 180/309 |
| 4,063,700 A | * | 12/1977 | Brewer ......................... | 248/62 |

* cited by examiner

Primary Examiner—Khanh Dang
(74) Attorney, Agent, or Firm—Thomas, Kayden, Horstemeyer & Risley LLP

(57) ABSTRACT

A hanger with swivel arm is adapted for securing a portion of an exhaust system such as a muffler, for example, to an undercarriage of automobile. In a preferred embodiment, the hanger incorporates an arm including a proximal end and a distal end, a bushing defining an orifice, and a retaining member. Preferably, the orifice is adapted for receiving the proximal end of the arm so that the proximal end is retainable by the bushing and rotatable therein, such as through an arc of 360°. The retaining member is configured to mount to the frame member of the automobile so that the bushing is fixedly retained thereby. So provided, the arm may be secured to a portion of the exhaust system so that the exhaust system is securely retained by the undercarriage of the automobile. Methods also are provided.

19 Claims, 3 Drawing Sheets

HANGER WITH SWIVEL ARM

CROSS-REFERENCE TO RELATED APPLICATIONS

This application claims the benefit of and priority to copending U.S. Provisional Patent Application entitled "Hanger with Swivel Arm," filed on Nov. 1, 2000, and accorded Ser. No. 60/244,860, which is entirely incorporated herein by reference.

BACKGROUND OF THE INVENTION

1. Field of the Invention

The present invention generally is related to hangers and, in particular, to a hanger with a swivel arm that is adapted for securing a muffler to an undercarriage of automobile, for instance.

2. Description of the Related Art

Heretofore, numerous devices such as clamps and hangers, for example, have been utilized for securing apparatuses, such as mufflers, exhaust pipes, etc., to the underside of automobiles. These devices, however, have met with various degrees of success, with those devices possessing the highest degree of success typically possessing characteristics of ease of installation and low cost.

Typically, much of the cost associated with such devices, particularly those devices utilized for securing exhaust pipes, has been associated with the necessity to produce the device in various sizes so that various sizes and configurations of exhaust pipes may be accommodated. Heretofore, however, there have been few devices that, without being produced in various sizes, have been configured to easily accommodate various sizes and configurations of exhaust pipes.

Therefore, there is a need for improved devices, systems and methods which address these and other shortcomings of the prior art.

SUMMARY OF THE INVENTION

Briefly described, the present invention relates to hangers and, in particular, to a hanger with a swivel arm that is adapted for securing a muffler to an undercarriage of automobile, for instance. In a preferred embodiment, the hanger incorporates an arm including a proximal end and a distal end, a bushing defining an orifice, and a retaining member. Preferably, the orifice is adapted for receiving the proximal end of the arm so that the proximal end is retainable by the bushing and rotatable therein. In some embodiments, the arm may rotate 360 degrees within the bushing. The retaining member is configured to mount to a frame member of the automobile so that the bushing is fixedly retained thereby. So provided, the arm may be secured to a portion of an exhaust system, such as by welding, thereby securely retaining the exhaust system to the undercarriage of the automobile.

In another embodiment, the hanger incorporates an arm which includes a proximal end and a distal end, means for receiving the proximal end of the arm, and means for mounting the means for receiving to the frame member of the automobile. Preferably, the means for receiving the proximal end of the arm is configured so that the proximal end is retainable by the means for receiving and rotatable therein, and the means for mounting the means for receiving is configured so that the means for receiving is fixedly retained by the first frame member of the automobile.

Some embodiments of the present invention may be construed as providing methods for securing an exhaust pipe to the undercarriage of an automobile. One such embodiment includes the steps of: (1) providing an arm having a proximal end and a distal end; (2) rotatably mounting the proximal end of the arm to the frame member of the automobile; (3) rotating the distal end of the arm such that the arm engages at least a portion of the exhaust system; and (4) securing the arm to the portion of the exhaust system such that the exhaust pipe is securely mounted to the undercarriage of the automobile.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF A PREFERRED EMBODIMENT

Figure 1:
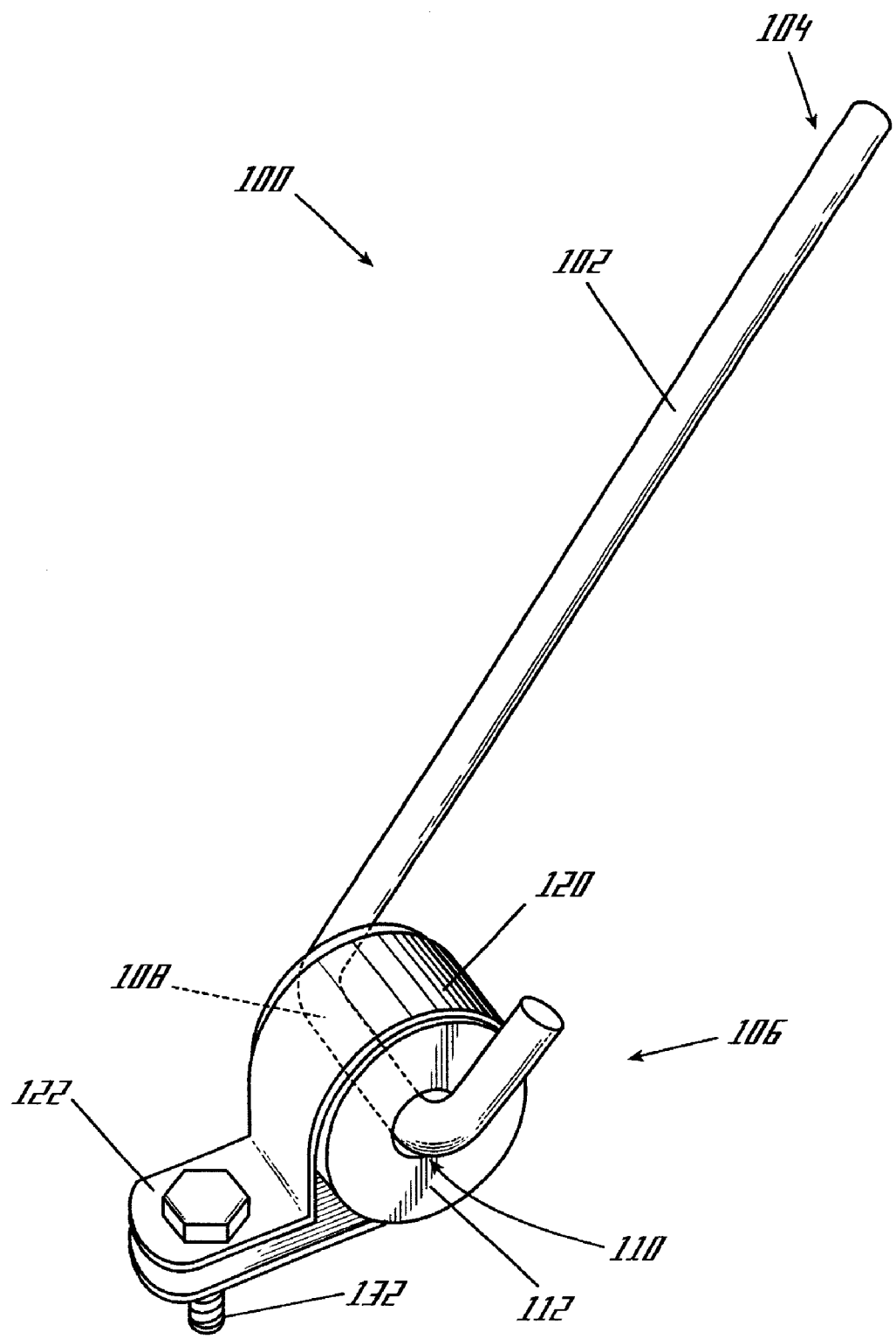
FIG. 1 is a perspective view of a preferred embodiment of the present invention.

Reference will now be made in detail to the description of the invention as illustrated in the drawings with like numerals indicating like parts throughout the several views. Referring now to FIG. 1, a preferred embodiment of the hanger 100 of the present invention incorporates an arm 102 which includes a free or distal end 104 and a captured or proximal end 106. Proximal end 106, which preferably is formed in a J-shaped configuration (although various other configurations may be utilized), includes a journal portion 108 which is adapted to be received within the orifice 110 of a bushing 112. Preferably, bushing 112 is formed of a shock absorbing material, such as rubber, for example, and is configured to capture the proximal end of the arm 102 so that the free end of the arm may be rotated through an arc without the arm easily detaching from the bushing. In some embodiments, such as the embodiment depicted in FIG. 1, the arm may rotate a full 360 degrees while being engaged within the bushing. Although the foregoing description of the cooperation of the swivel arm and bushing is representative of the preferred embodiment depicted in the accompanying figures, various other embodiments of the hanger may utilize configurations other than the one depicted provided that the arm is capable of rotating relative to the bushing.

Bushing 112 preferably is clamped about an exterior surface thereof by a retaining member 120 which preferably terminates at each of its ends to form a flanged portion 122. Flanged portion 122 is adapted to receive a mechanical fastener, such as a bolt of a bolt and nut assembly that, in addition to retaining each of the ends of the retainer member in proximity to each other, is adapted to secure the retainer member to another component, such as a frame member of the undercarriage of an automobile, for example.

Figure 2:
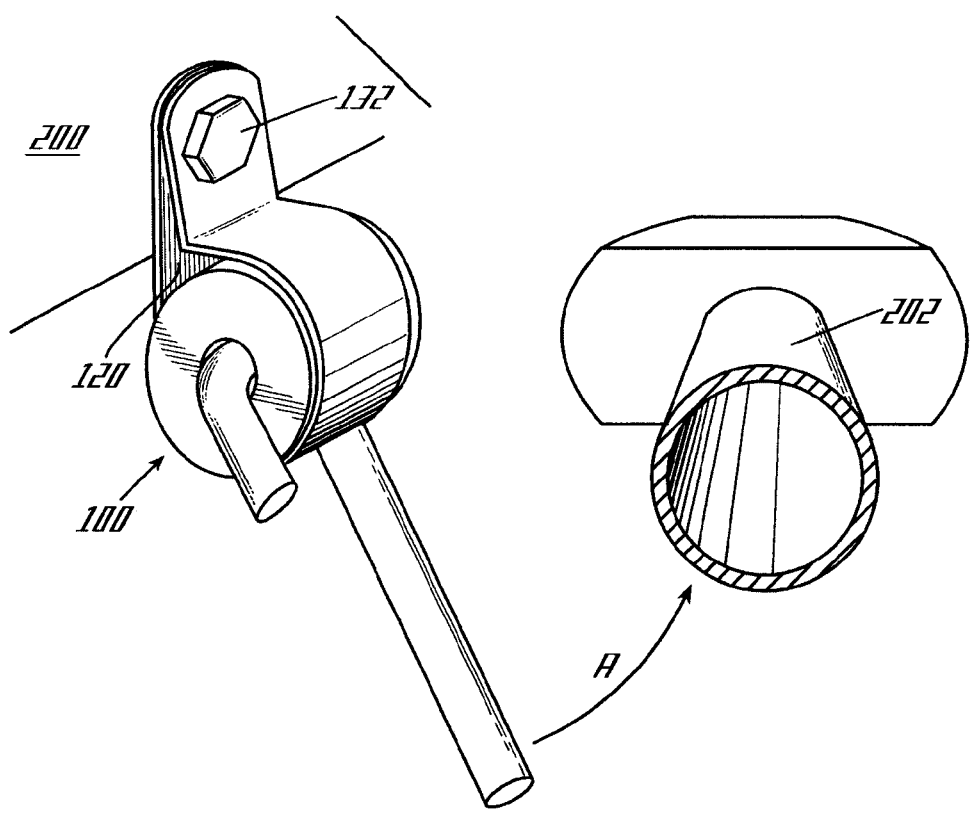
FIG. 2 is a perspective view of the embodiment of the invention depicted in FIG. 1 shown being secured to the underside of a representative automobile.
Figure 3:
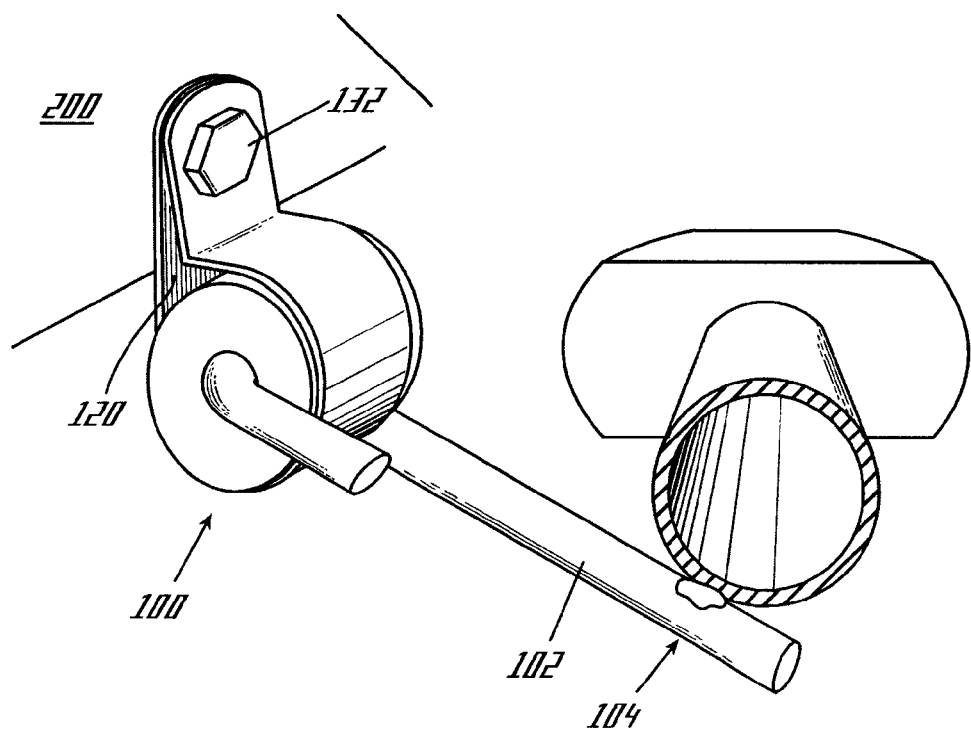
FIG. 3 is a perspective view of the embodiment of the invention depicted in FIGS. 1 and 2 shown installed on the underside of a representative automobile and securing a representative exhaust pipe.

Referring now to FIG. 2, preferred installation of the hanger 100 will now be described in greater detail. As shown in FIG. 2, hanger 100 and, more specifically, retainer member 120 is adapted to be secured to a frame member 200, or other suitable portion of an undercarriage of an undercarriage of an automobile. For instance, in the embodiment depicted in FIG. 2, bolt 132 is received through frame member 200 and secured thereto by a nut (not shown). Once so secured, arm 102 may be rotated in direction A until a portion of the arm contacts a suitable portion of the exhaust system (see, FIG. 3), such as an exhaust pipe 202, for example. The arm may then be secured to that portion of the exhaust system, such as by welding, or any other suitable method for fixedly securing the arm to the frame member. So provided, the muffler, tailpipe and/or other associated components of an exhaust system may be suitably secured to the underside of the automobile by being retained by the hanger.

Additionally, it should be noted that the tendency of a rigid engagement between the exhaust system and the hanger, e.g., a rigid engagement formed by a weld, to fail due to vibration, for instance, may be reduced by the configuration of the bushing 112. More specifically, the material of the bushing, e.g., rubber, may act as a shock absorber, thereby reducing the tendency of such a rigid engagement to fail.

Figure 4:
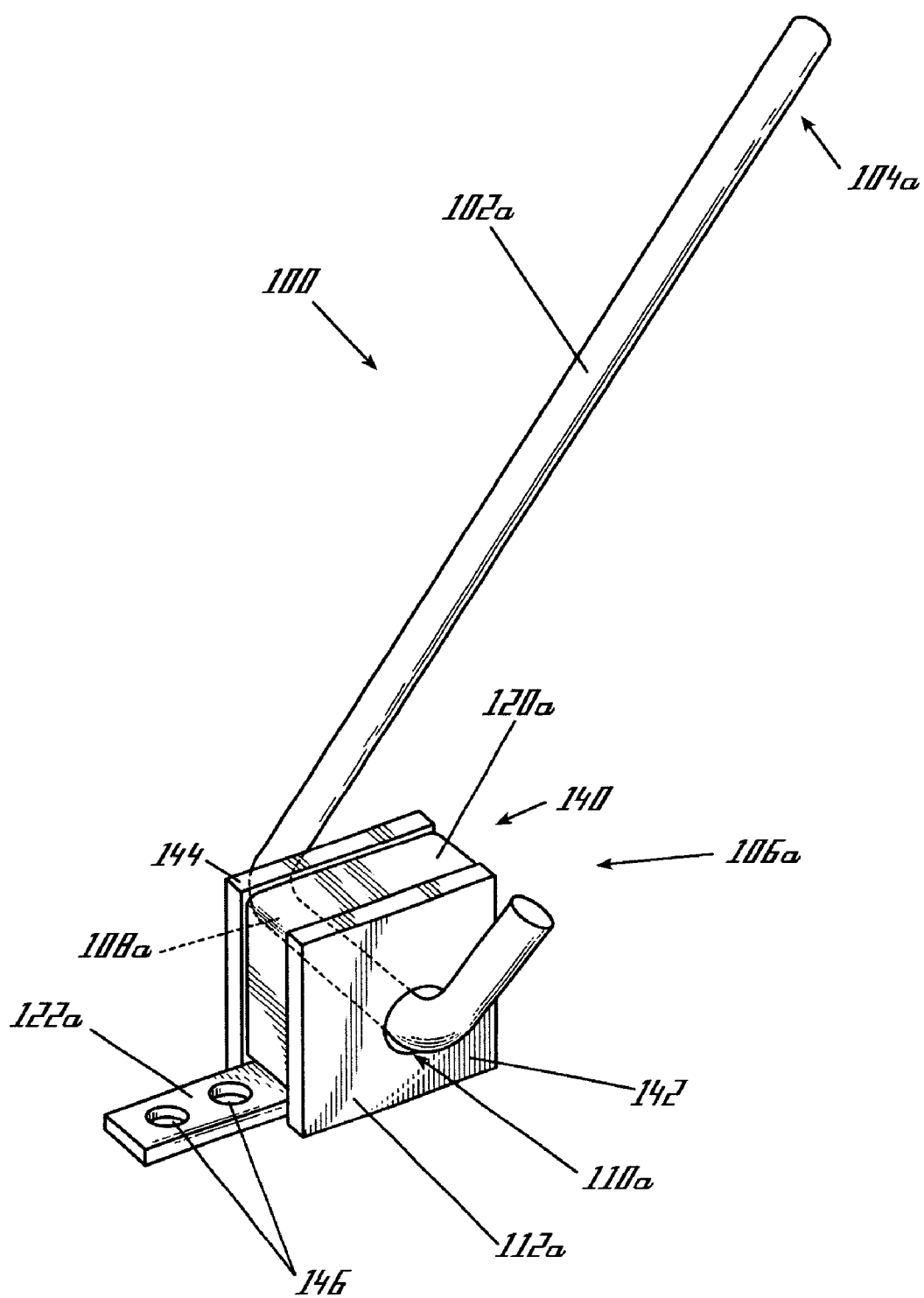
FIG. 4 is a perspective view of an alternative embodiment of the present invention.

Reference will now be made to FIG. 4, which depicts an alternative embodiment of the hanger 100. As shown in FIG. 4, arm 102a of the hanger includes a free or distal end 104a and a captured or proximal end 106a. Proximal end 106a, which preferably is configured as a J-shaped member, includes a journal portion 108a that is adapted to be received within the orifice 110a of a bushing 112a. Preferably, bushing 112a is formed of a shock absorbing material, such as rubber, for example, and is configured to capture the proximal end of the arm 102a.

Bushing 112a preferably is configured with an intermediate portion 140 that is disposed between end portions 142 and 144, respectively. End portions may be provided in various configurations, such as generally rectangular, as depicted in FIG. 4. The intermediate portion is adapted to receive thereabout a retaining member 120a which preferably terminates at each of its ends to form a flanged portion 122a. Flanged portion 122a is adapted to receive, such as by use of one or more holes 146, a mechanical fastener. e.g., a bolt of a bolt and nut assembly. So provided, the hanger 100 may be conveniently mounted to the undercarriage of an automobile, for instance, as described hereinbefore. Due to the preferred configuration of the end portions and intermediate portion of the bushing, e.g., the periphery of the end portions extend beyond the periphery of the intermediate portion and the retainer, an enhancement in performance may be achieved as the extended outer edge or periphery of the end portions may engage portions of the undercarriage to which it is attached, thereby potentially limiting direct metal-to-metal contact and accompanying wear.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A hanger for securing an exhaust pipe to the undercarriage of an automobile, the automobile undercarriage having a frame member, said hanger comprising:

an arm having a proximal end and a distal end;

a bushing defining an orifice, said orifice being adapted for receiving said proximal end of said arm, said proximal end of said arm being loosely retained by said bushing such that said arm is rotatable therein; and a retaining member engaging an exterior surface of said bushing, said retaining member being formed, at least partially, of a strip of material, at least a portion of said strip of material being shaped to conform to at least a portion of said exterior surface of said bushing, said strip of material terminating in a flanged portion, said flanged portion extending outwardly from said bushing, said retaining member being configured to mount to the frame member of the automobile such that said bushing is fixedly retained thereby, said arm being securable to a portion of the exhaust system such that the exhaust pipe is securely retained by the undercarriage of the automobile.

2. The hanger of claim 1, wherein said arm is configured as a J-shaped member.

3. The hanger of claim 1, wherein said bushing is formed of a shock-absorbing material.

4. The hanger of claim 1, wherein said flanged portion includes a first flanged portion formed at a first end of said strip of material and a second flanged portion formed at a second end of said strip of material, said first flanged portion having a first hole formed therethrough and said second flanged portion having a second hole formed therethrough, said first and second holes being adapted to be aligned with each other such that a bolt is receivable therethrough.

5. The hanger of claim 1, wherein said strip of material has opposing sides edges, said opposing side edges being intermediately disposed between ends of said bushing such that said arm is prevented from contacting said opposing side edges of said retainer member.

6. The hanger of claim 1, wherein said arm is rotatable 360° within said orifice of said bushing.

7. The hanger of claim 1, wherein said arm is configured for welding to the portion of the exhaust system.

8. The hanger of claim 2, wherein said proximal end of said arm is formed of a longitudinally, downwardly extending first portion, a transversely extending second portion and a longitudinally, upwardly extending third portion, and wherein at least a portion of said transversely extending second portion is adapted to be received and retained by said bushing.

9. The hanger of claim 1, wherein said arm has a circular cross-section.

10. The hanger of claim 3, wherein said shock-absorbing material is rubber.

11. The hanger of claim 1, wherein said orifice is circular.

12. The hanger of claim 1, wherein said bushing is cylindrical about a central longitudinal axis of said orifice.

13. The hanger of claim 1, wherein said bushing further includes an intermediate portion, rectangularly shaped in cross-section, disposed about a central longitudinal axis of said orifice.

14. The hanger of claim 13, wherein said bushing further includes a first end portion and a second end portion disposed on opposing ends of said intermediate portion, each of said first and said second end portions being defined by a rectangular periphery, said rectangular peripheries extending beyond a periphery of said intermediate portion.

15. The hanger of claim 1, wherein said arm is configured as a J-shaped member having a circular cross section, said distal end is configured for welding the exhaust system, said bushing comprises a cylinder formed concentrically about said orifice, said orifice having a circular cross section, and said flanged portion has first and second holes formed therethrough, said first and second holes being adapted to be aligned with each other such that a bolt is receivable therethrough.

16. The hanger of claim 4, wherein said bushing is formed of a shock-absorbing material.

17. The hanger of claim 16, wherein said arm is configured as a J-shaped member.

18. The hanger of claim 16, wherein said strip of material has opposing sides edges, said opposing side edges being intermediately disposed between ends of said bushing such that said arm is substantially prevented from contacting said opposing side edges of said retainer member.

19. The hanger of claim 17, wherein said arm is rotatable 360° within said orifice of said bushing.

* * * * *